Patented Mar. 22, 1927.

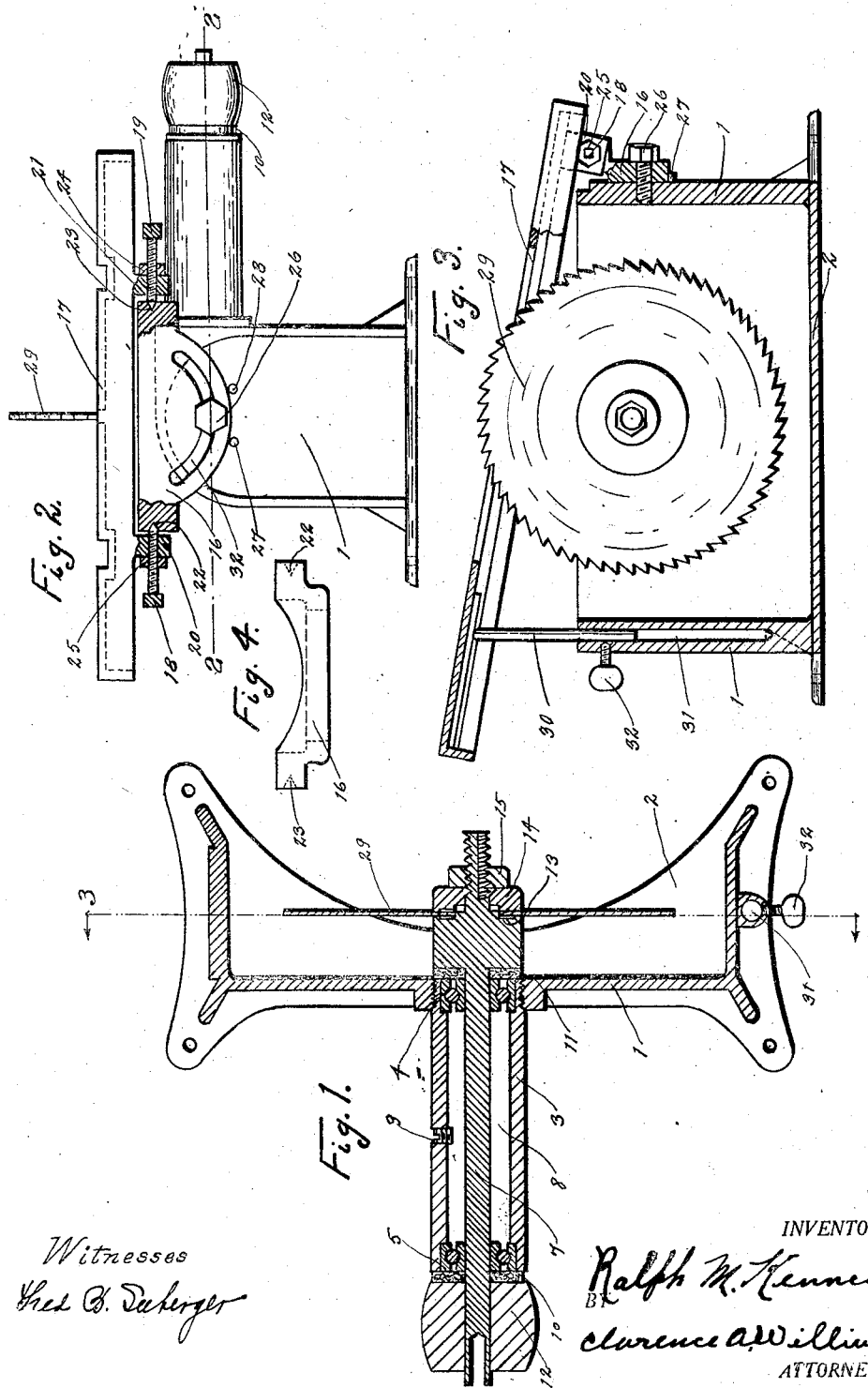

1,622,237

UNITED STATES PATENT OFFICE.

RALPH M. KENNEDY, OF PHILADELPHIA, PENNSYLVANIA.

POWER SAW.

Application filed December 8, 1924. Serial No. 754,550.

My invention relates to power-saws, and particularly to saws with adjustable tables. One of the objects of my invention is to provide a power-saw having a wide range of usefulness, and that is compact, rigid, and simple in construction and operation, and can be manufactured at low cost and be efficient to do the work of machines which are more complicated in their construction and costly. A further object is to provide a simple means for rapid adjustment of the work table in relation to the saw, and to reduce the number of parts necessary to the complete machine.

The above objects and other advantages are attained by the combination and arrangement of parts hereinafter more specifically set forth in connection with the accompanying drawing, in which—

Fig. 1 is a sectional plan view on line 1—1 of Fig. 2.

Fig. 2 is a rear elevation of the same, partly in section.

Fig. 3 is a view in cross section on line 3—3 of Fig. 1, and

Fig. 4 is a plan view of one of the detail parts of the machine.

The structure comprises a frame 1, having an integral base portion 2 and, preferably, formed of cast iron. To the frame is threadedly attached the spindle housing 3 having a removable ball bearing 4 within one end and a similar ball bearing 5 within the other end. The saw spindle 7, carrying a pulley 12 is disposed in the ball bearings 4 and 5, leaving an oil space or reservoir 8 within which the lubricant is placed, through the opening 9 to supply the bearings. Felt washers 10 and 11 may be provided at the ends of the spindle housing to prevent any leakage of the lubricant to the exterior and at the same time prevent the entrance of dust and other foreign matter to the bearings.

The head of the spindle 7 is provided with the usual shoulder portion 13 and flange 14 and a nut 15 on the spindle end for securing the saw 29 to the spindle 7. The spindle housing, 3, as will be readily apparent, is such that it may be easily removed with the bearings and spindle assembled therein.

A quadrant 16 (see Fig. 2) is secured to the work table 17 by means of the set screws 18 and 19, carrying lock nuts 24 and 25, said screws passing through lugs 20 and 21 integral with the table at its rear. The ends of the screws 18 and 19 are of conical form and enter the countersunk holes 22 and 23 in the ends of the quadrant, 16, thus providing pivotal points by which the work table may be readily raised and lowered with the least resistance or friction. The quadrant, 16, is operatively secured to one end of the frame 1 by a screw 26 extending from the frame through the arcuate slot, 32, in the quadrant and may be loosened or tightened to permit adjusting the table and to secure it in any desired adjusted position relative to the saw. The frame also carries spaced pins 27 and 28 upon which the quadrant, 16, operatively engages. The frame is also provided with a vertically disposed pin 30, slidably disposed within an opening 31 in the end of the frame opposite that to which the segment is attached, and is adapted to hold the table in an elevated position, as shown in Fig. 3, there being a thumb screw 32 carried by frame 1 to secure the pin 30 in adjusted position.

From the foregoing description, it will be apparent that the work table 17 through which the saw 29 projects, and which is normally at right angles to the plane of the saw, may be tilted laterally or transversely by loosening the set screw 26 and tilting the table to the desired angle, after which the screw 26 is set up to lock the table in its adjusted position. Also the table may be tilted longitudinally and supported in this adjusted position by means of the pin 30, which is vertically adjustable in the opening 31, and locked in its adjusted position by the thumb screw 32, the front end of the table pivoting on the set screws 18 and 19, which engage the ends of the quadrant 16. As the table may be tilted both laterally and longitudinally with respect to the plane of the saw, it will be apparent that adjustment of the table to effect any desired straight saw cut in the material operated upon may be readily and accurately made.

While I have shown and described an operative embodiment of my invention it is to be understood that changes and substitution of parts may be made without departing from the spirit and scope of the appended claims.

I claim as my invention and desire to secure by Letters Patent:

1. A power sawing machine, comprising a supporting frame, a work table, a quadrant member connecting the table with the frame and adapted to function as a hinge connection to permit inclining the table in the direction of its length also to permit said table being inclined transversely, means to hold the table in its longitudinal elevation, means carried by the frame and co-operating with the quadrant for locking the table in the desired transverse position, and a saw spindle, rotatably supported on said frame.

2. A power sawing machine, comprising a supporting frame, a work table, a quadrant member pivotally connected at its ends to the table, means supporting and connecting the quadrant to one end of the frame, an adjustable supporting member for said table and carried by the opposite end of the frame, a saw spindle journaled on said frame below the table, and a saw carried by the spindle, said table adapted to be inclinedly adjusted either or both longitudinally and transversely of the frame upon said quadrant member and retained in its adjusted position by said supports.

3. A power-saw, comprising a supporting frame, a work table, a quadrant member hingedly securing the table to the frame for longitudinal inclined adjustment of the table with respect to the frame also for lateral adjustment with respect to the frame, a vertically adjustable member carried by the frame for supporting the table in its longitudinal adjusted position, means for locking the quadrant to the frame to secure the table in its lateral adjusted position, and a saw spindle journaled on said frame.

4. In a machine of the class described a supporting frame, a saw table upon the frame and hingedly attached with one end of the frame so as to be swingable up and down with its other end, a screw in the frame for supporting the movable end of the table and adjusting its height; said table having a saw slot, a circular saw blade projecting up through said slot and having an arbor journaled in the supporting frame, and means for tilting the hinged end of the table to adjust the angular relation of the top of the table to the side of the saw blade.

5. The structure specified in claim 4, and means for adjusting the table in horizontal direction relative to the sides of the saw blade.

6. A power saw machine comprising a frame having an integral base portion, a work table, a quadrant member connecting the table with the frame and adapted to function as a hinge connection to permit inclining the table in the direction of its length, also to permit said table being inclined transversely, means to hold the table in its longitudinal elevation, and means carried by the frame and co-operating with the quadrant for locking the table in the desired transverse position.

In testimony whereof, I have hereunto signed my name.

RALPH M. KENNEDY.